(12) United States Patent
Chen et al.

(10) Patent No.: US 11,501,225 B2
(45) Date of Patent: Nov. 15, 2022

(54) INTELLIGENT METHOD TO IDENTIFY COMPLEXITY OF WORK ARTIFACTS

(71) Applicant: INTERNATIONAL BUSINESS MACHINES CORPORATION, Armonk, NY (US)

(72) Inventors: Yang Chen, Beijing (CN); Li Cao, Beijing (CN); Ya Ju Yan, Beijing (CN); Zhou Kun, Beijing (CN); Li Hong Qi, Beijing (CN); Xiao Juan Chen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 9 days.

(21) Appl. No.: 17/143,524

(22) Filed: Jan. 7, 2021

(65) Prior Publication Data

US 2022/0215328 A1    Jul. 7, 2022

(51) Int. Cl.
*G06Q 10/06* (2012.01)
*G06N 20/00* (2019.01)

(52) U.S. Cl.
CPC ..... *G06Q 10/063118* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,466,039 B2 | 10/2016 | Gatti et al. | |
| 10,049,332 B2 | 8/2018 | Jones et al. | |
| 10,140,164 B2 * | 11/2018 | Mehta | G06F 16/24578 |
| 10,511,510 B2 * | 12/2019 | Ricci | H04L 43/0876 |
| 10,552,777 B2 | 2/2020 | Anderson et al. | |
| 10,990,760 B1 * | 4/2021 | Monnett | G06F 40/295 |
| 2009/0055684 A1 * | 2/2009 | Jamjoom | G06F 11/0709 714/26 |
| 2009/0125432 A1 * | 5/2009 | Deshpande | G06Q 10/06 705/37 |
| 2010/0023367 A1 | 1/2010 | Xie | |

(Continued)

FOREIGN PATENT DOCUMENTS

| | | |
|---|---|---|
| CN | 101038640 A | 9/2007 |
| CN | 101742394 B | 7/2012 |

(Continued)

OTHER PUBLICATIONS

Sun, Peng, et al. "Content-aware resolution sequence mining for ticket routing." International Conference on Business Process Management. Springer, Berlin, Heidelberg, 2010. (Year: 2010).*

(Continued)

*Primary Examiner* — Brian M Epstein
*Assistant Examiner* — Derick J Holzmacher
(74) *Attorney, Agent, or Firm* — Conley Rose, P.C.

(57) ABSTRACT

An automated method for determining a complexity of a task. The method includes extracting data from the plurality of historical support tickets to generate training data. The method trains a complexity model to predict a complexity value of a task associated with a support ticket using the training data. The method predicts, using the complexity model, the complexity value of a new task associated with a new support ticket.

14 Claims, 6 Drawing Sheets

(56) References Cited

U.S. PATENT DOCUMENTS

| | | | | |
|---|---|---|---|---|
| 2012/0323623 | A1* | 12/2012 | Sabharwal | G06Q 10/063112 705/7.14 |
| 2012/0323640 | A1* | 12/2012 | Sabharwal | G06Q 10/06398 705/7.39 |
| 2013/0132060 | A1* | 5/2013 | Badhe | G06F 16/355 703/22 |
| 2013/0282725 | A1* | 10/2013 | Rubinger | G06F 16/17 707/E17.046 |
| 2014/0351176 | A1* | 11/2014 | Jan | G06N 7/005 706/12 |
| 2015/0286969 | A1* | 10/2015 | Warner | G06Q 10/0633 705/7.27 |
| 2015/0346918 | A1* | 12/2015 | Bodda | G06Q 10/06313 715/825 |
| 2015/0347906 | A1* | 12/2015 | Bodda | G06Q 10/20 706/52 |
| 2016/0078380 | A1* | 3/2016 | Li | G06Q 10/06313 705/7.23 |
| 2016/0357859 | A1* | 12/2016 | Agarwal | G06F 40/279 |
| 2017/0116616 | A1 | 4/2017 | Donatelli et al. | |
| 2017/0132557 | A1* | 5/2017 | Venkataraman | G06Q 10/063114 |
| 2017/0235662 | A1* | 8/2017 | Leask | G06F 11/302 717/125 |
| 2017/0372231 | A1* | 12/2017 | Ghatage | G06F 40/58 |
| 2018/0024868 | A1* | 1/2018 | Mehta | G06F 16/24569 718/104 |
| 2018/0039914 | A1* | 2/2018 | Menahem | G06Q 10/20 |
| 2018/0139116 | A1* | 5/2018 | Ricci | H04L 41/5067 |
| 2018/0157991 | A1 | 6/2018 | Wang et al. | |
| 2018/0197072 | A1* | 7/2018 | Hausler | G06F 16/35 |
| 2018/0225583 | A1* | 8/2018 | Chen | G06N 20/00 |
| 2019/0089577 | A1* | 3/2019 | Misra | G06F 16/9024 |
| 2019/0132191 | A1* | 5/2019 | Mann | G06N 20/00 |
| 2019/0318204 | A1* | 10/2019 | Mishra | G06N 3/082 |
| 2019/0370394 | A1* | 12/2019 | Li | G06N 3/0445 |
| 2020/0012728 | A1* | 1/2020 | Jan | G06N 20/00 |
| 2020/0019893 | A1* | 1/2020 | Lu | G06N 20/00 |
| 2020/0065733 | A1* | 2/2020 | Bhattacharyya | G06Q 10/0639 |
| 2020/0104774 | A1* | 4/2020 | Sun | G06Q 10/06393 |
| 2020/0162312 | A1* | 5/2020 | Balasubramanian | G06N 5/022 |
| 2020/0202302 | A1* | 6/2020 | Rathod | G06K 9/6223 |
| 2020/0258013 | A1* | 8/2020 | Monnett | G06Q 10/06 |
| 2020/0285697 | A1* | 9/2020 | Balasubramanian | G06F 16/355 |
| 2020/0293946 | A1* | 9/2020 | Sachan | G06N 5/04 |
| 2020/0356412 | A1* | 11/2020 | Ganguly | G06F 9/5027 |
| 2021/0004706 | A1* | 1/2021 | Riddle | G06Q 30/016 |
| 2021/0014136 | A1* | 1/2021 | Rath | G06N 20/20 |
| 2021/0328888 | A1* | 10/2021 | Rath | G06Q 30/016 |

FOREIGN PATENT DOCUMENTS

| | | | | |
|---|---|---|---|---|
| WO | WO-2019083667 | A1 * | 5/2019 | G06F 11/3006 |
| WO | WO-2019083668 | A1 * | 5/2019 | G06F 8/60 |

OTHER PUBLICATIONS

Roy, Suman, et al. "Fuzzy QoS modeling of IT maintenance tickets." 2017 IEEE International Conference on Web Services (ICWS). IEEE, 2017. (Year: 2017).*

Han, Jianglei, et al. "Towards effective extraction and linking of software mentions from user-generated support tickets." Proceedings of the 27th ACM International Conference on Information and Knowledge Management. 2018. (Year: 2018).*

* cited by examiner

INTELLIGENT METHOD TO IDENTIFY COMPLEXITY OF WORK ARTIFACTS

BACKGROUND

Support service is one aspect of business that is essential to every industry. Regardless of industry, it is crucial to deliver the best service possible to all customers.

SUMMARY

The disclosed embodiments include an automated method, system, and computer program product for determining a complexity of a task. In an embodiment, the method, system, and computer program product are configured to extract data from a plurality of historical support tickets to generate training data; train a complexity model to predict a complexity value of a task associated with a support ticket using the training data; receive a new support ticket that requests assistance with performance of a new task; and predict, using the complexity model, the complexity value of the new task associated with the new support ticket.

In various embodiments, the process of extracting data from the plurality of historical support tickets to generate training data includes extracting one or more text characters from text fields of the plurality of historical support tickets; generating one or more features of the plurality of historical support tickets by vectorizing the extracted text characters; extracting one or more values from one or more value fields of the plurality of historical support tickets; and generating one or more labels of the plurality of historical support tickets using the one or more extracted values from the one or more value fields of the plurality of historical support tickets.

In various embodiments, the process of generating one or more labels of the plurality of historical support tickets using the one or more extracted values from the one or more value fields of the plurality of historical support tickets includes normalizing each of the extracted values from the one or more value fields of the plurality of historical support tickets so that the one or more extracted values have a maximum value of one; setting a weight value for each of the extracted values; and calculating the one or more labels of the plurality of historical support tickets using the weight value for each of the extracted values.

In various embodiments, the process of calculating the one or more labels of the plurality of historical support tickets using the weight value for each of the extracted values uses formula: $L=W_1*l_1+\Sigma_{i=2}^n W_i l_i$, where L is a label, W is the weight value, l is extracted value/max value, and n is a number of extracted values.

In various embodiments, the process of predicting, using the complexity model, the complexity value of the new task associated with the new support ticket includes determining an initial complexity value of the new task associated with the new support ticket using the complexity model; determining a set of similar support tickets from the plurality of historical support tickets that are similar to the new support ticket; and adjusting the initial complexity value of the new task associated with the new support ticket based on one or more similarity and complexity values of one or more similar support tickets in the set of similar support tickets to determine the complexity value of the new task associated with the new support ticket.

In various embodiments, a weight to the one or more similarity and complexity values of tickets in the set of similar tickets.

In various embodiments, the weight is based on a reporting time of the similar support tickets in the set of similar support tickets.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
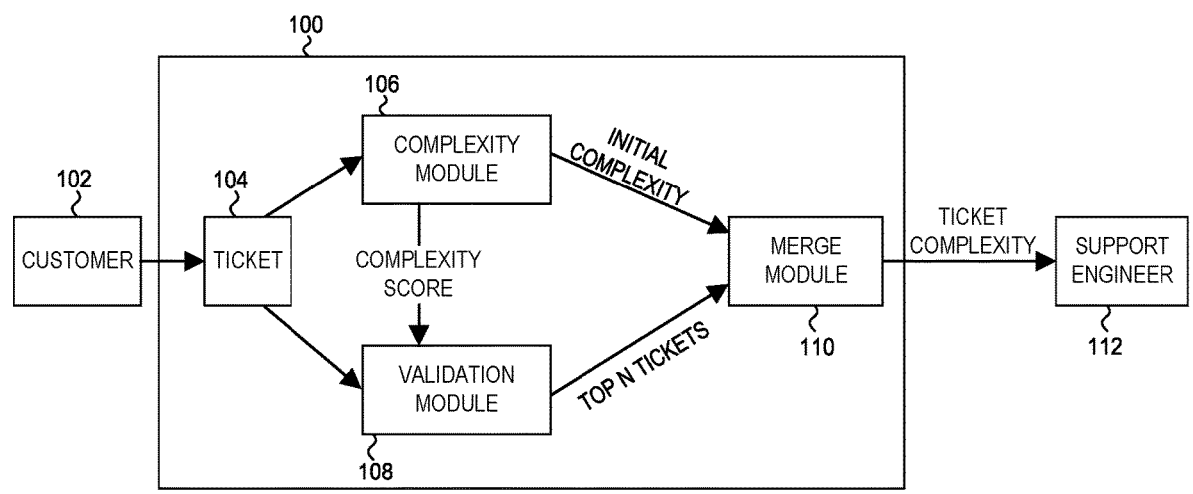
FIG. 1 is a schematic drawing illustrating a process for determining a complexity of a task in accordance with an embodiment of the present disclosure.

The illustrated figures are only exemplary and are not intended to assert or imply any limitation with regard to the environment, architecture, design, or process in which different embodiments may be implemented.

DETAILED DESCRIPTION

A customer support engineer usually handles a support ticket per its priority which is mainly evaluated by the time the case has been open, severity level, etc. The priority may be a value (e.g., 1-10) or a status (e.g., normal, rush, etc.) that is printed on a ticket. The priority may be based on how critical a task is, the person requesting the task, or other factors. However, even if two support tickets are assigned similar priorities, there may be reasons for addressing a particular support ticket before another with the same or higher priority. For example, even if two support tickets have the same priority, one support ticket may involve a common or known issue and can be solved very quickly, while the other support ticket may involve a new or complex issue that can take longer to solve. In this case, the ticket with the commonly known issue should be handled first because the problem can be resolved quickly, and thus reducing any impact caused by the issue to the customer. This can increase customer satisfaction by reducing overall response time. Thus, it would be advantageous to be able to automatically identify the complexity of a task related to a support ticket to increase productivity and customer satisfaction.

The present disclosure describes various embodiments that include an automated method, system, and computer program product for determining a complexity of a task. In an embodiment, the system is configured to extract data from a plurality of historical support tickets to generate training data; train a complexity model to predict a complexity value of a task associated with a support ticket using the training data; receive a new support ticket that requests assistance with performance of a new task; and predict, using the complexity model, the complexity value of the new task associated with the new support ticket.

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to." Unless otherwise indicated, as used throughout this document, "or" does not require mutual exclusivity, and the singular forms "a", "an" and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a module may also refer to a particular set of functions or computer executable instructions configured to perform a specific task. For example, a module may comprise of software components such as, but not limited to, data access objects, service components, user interface components, application programming interface (API) components; hardware components such as electrical circuitry, processors, and memory; and/or a combination thereof. As referenced herein, computer executable instructions may be in any form including, but not limited to, machine code, assembly code, and high-level programming code written in any programming language.

Figure 2:
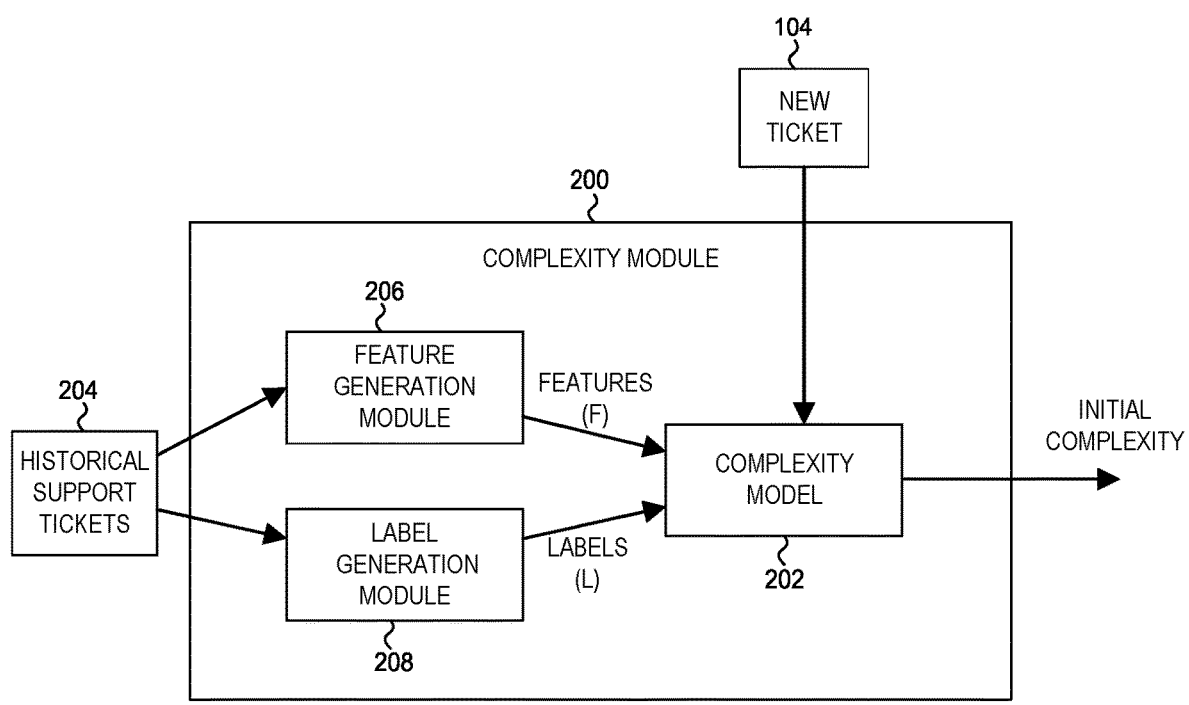
FIG. 2 is a schematic drawing illustrating a complexity module in accordance with an embodiment of the present disclosure.
Figure 3:
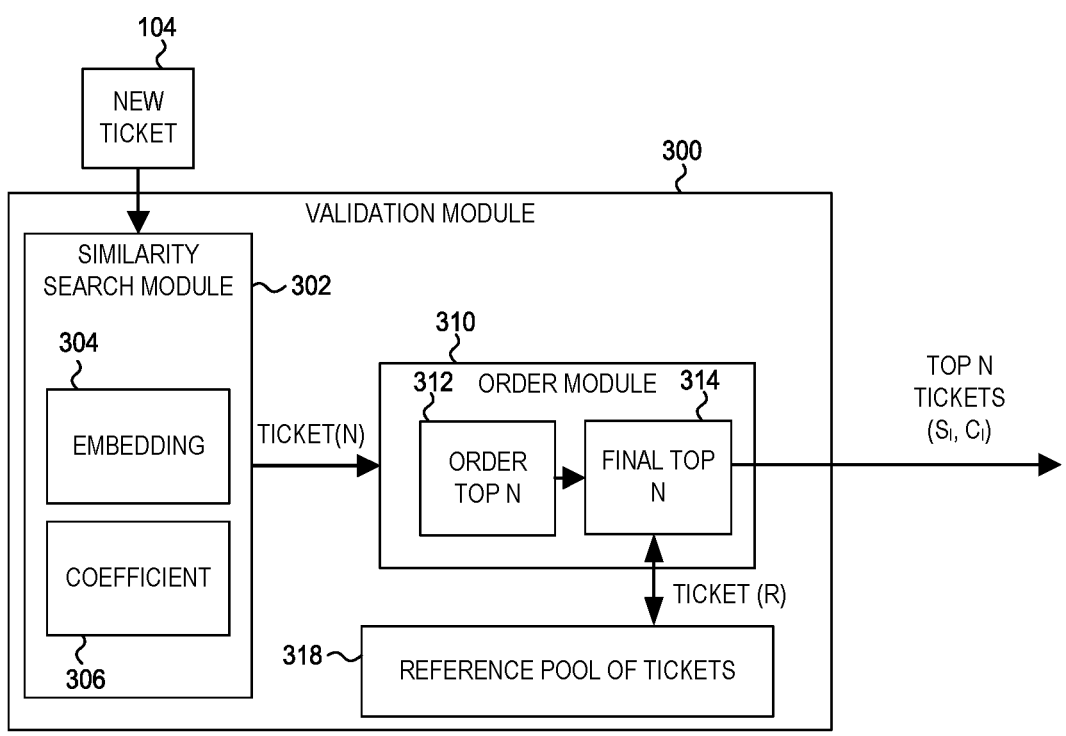
FIG. 3 is a schematic drawing illustrating a validation module in accordance with an embodiment of the present disclosure.
Figure 4:
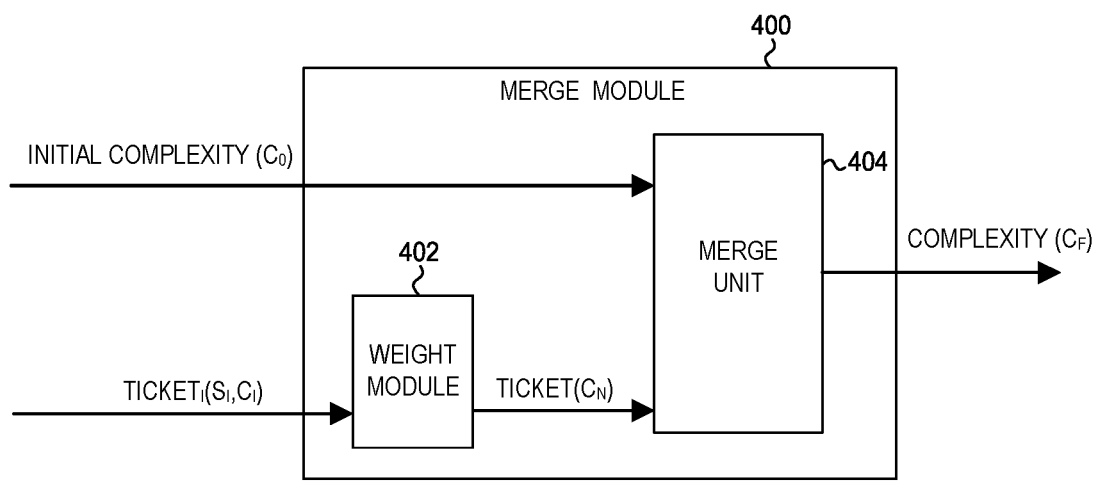
FIG. 4 is a schematic drawing illustrating a merge module in accordance with an embodiment of the present disclosure.

FIG. 1 is a schematic drawing illustrating a process for determining a complexity of a task in accordance with an embodiment of the present disclosure. In the depicted embodiment, a customer 102, using a computer or any other suitable electronic device, requests support or assistance by providing information to a customer support system 100. The customer support system 100 uses the information provided by the customer 102 to generate a new support request ticket 104. The ticket 104 may request support to perform any kind of tasks such as, but not limited to, request support to fix an issue and/or request support to perform a particular task (e.g., cloud application deployment). In accordance with a disclosed embodiment, the ticket 104 is passed to a complexity module 106 and a validation module 108. The complexity module 106, as further described in FIG. 2, is configured to use a complexity model to determine an initial complexity value for the task associated with the ticket 104. The validation module 108, as further described in FIG. 3, is configured to identify and use similar past ticket requests to correct any deviation in the initial complexity value. The initial complexity value of the new ticket 104 and the complexity values of the top N similar ticket requests are inputted into a merge module 110. N, as used herein, can be any predetermined number or can be a user-specified number. For example, in an embodiment, the top 10 similar ticket requests can be used to correct any deviation in the initial complexity value. In an embodiment, the merge module 110, as further described in FIG. 4, is configured to combine the initial complexity value generated by the complexity module 106 with the average weighted complexity values for the top N similar ticket requests produced by the validation module 108 to determine a more accurate final complexity value for the task associated with the ticket 104. The final complexity value for the task associated with the ticket 104 can be printed on the ticket 104 or indicated in some other manner to enable a support engineer 112 to properly prioritize the task associated with the ticket 104 with other pending tickets.

FIG. 2 is a schematic drawing illustrating a complexity module 200 in accordance with an embodiment of the present disclosure. The complexity module 200 is an example of the complexity module 106 in FIG. 1. In an embodiment, the complexity module 200 is configured to determine an initial complexity value for the ticket 104 using a complexity model 202. In an embodiment, the complexity model 202 is built and trained using a machine learning algorithm based on training data from a plurality of historical support tickets 204. In an embodiment, the complexity model 202 is a regression model and is trained using a linear regression learning algorithm for enabling the complexity model 202 to predict a numeric complexity value of the new ticket 104. The plurality of historical support tickets 204 contain data attributes such as, but not limited to, feature information, resolution or label information, and complexity values for each of the historical support tickets 204. The complexity values for each of the historical support tickets 204 may have been manually determined based on the experiences of one or more support engineers 112 that dealt with the tasks related to each of the historical support tickets 204.

In an embodiment, the plurality of historical support tickets 204 are passed to a feature generation module 206 and a label generation module 208 for extracting the data attributes from each of the historical support tickets 204. For example, in an embodiment, the feature generation module 206 is configured to parse and extract textual features (F) of the plurality of historical support tickets 204 such as, but not limited to, text characters from a subject, description, version, problem occurred time, or other fields of the plurality of historical support tickets 204. In an embodiment, the textual data is converted into vectors so that the features of a historical support ticket 204 can be compared with the features of other historical support tickets 204. In an embodiment, the text vectorization process maps words or phrases from vocabulary to a corresponding vector of real numbers. After the words are converted as vectors, techniques such as Euclidean distance or cosine similarity can be used to identify similar words and/or the semantics/meaning of words or phrases.

In an embodiment, the label generation module 208 is configured to parse and extract label (L) values, such as, but not limited to, values corresponding to case working hours, time to close, time to resolution, or other fields of the plurality of historical support tickets 204. In an embodiment, the label generation module 208 normalizes each of the extracted label values (l) based on the maximum value of each label (l=value/max value) so that the value of l is between 0 and 1. In an embodiment, a weight value (W) is assigned to each label. The weight value may be based on the experience of support engineers or may be customer specified to indicate the importance of a particular label. For example, the label "time to resolution" may be a more important factor than the label "working hours" and assigned a higher weight. As a non-limiting example, below is chart illustrating the label values and weight for one historical support ticket 204.

| Ticket 1 Extracted Values | Value-l | Weight-W |
|---|---|---|
| Time to give resolution | 0.89 | 0.3 |
| Time to close | 0.7 | 0.15 |
| Working hours | 0.5 | 0.2 |
| Time to first response | 0.2 | 0.23 |
| ... | ... | ... |

In an embodiment, a final label value for each label for all the plurality of historical support tickets 204 can be calculated using the equation: $L=W_1*l_1+\Sigma_{i=2}^{n}W_i l_i$, where L is a label, W is the weight value, l is extracted value/max value, and n is a number of extracted values/labels.

Once all the feature and label generation are determined in the plurality of historical support tickets 204, this information is used as training data to train the complexity model 202. In an embodiment, a learning algorithm finds patterns in the training data that map the input feature and label data attributes to the input complexity values of the plurality of historical support tickets 204 to train the complexity model 202. In an embodiment, the complexity model 202 can then be used to predict an initial complexity value based on the data attributes of a new ticket 104 as shown in FIG. 2.

FIG. 3 is a schematic drawing illustrating a validation module 300 in accordance with an embodiment of the present disclosure. The validation module 300 is an example of the validation module 108 in FIG. 1. As described in FIG. 1, the validation module 300 is configured to identify and use similar ticket requests to correct any deviation in the initial complexity value of a new ticket 104. In the depicted embodiment, the validation module 300 includes a similarity search module 302 and an order module 310. In an embodiment, the similarity search module 302 is configured to identify similar tickets to the new ticket 104, and the order module 310 is configured to order the top N tickets by their similarity.

In an embodiment, the similarity search module 302 includes an embedding module 304 and a coefficient module 306. The new ticket 104 is initially passed to the embedding module 304 of the similarity search module 302. The new ticket 104 may include text information such as, but not limited to, a subject, a description, product version, operating system, or any other information that may be associated with a support ticket. The embedding module 304 is configured to perform similar functions as the feature generation module 206 in FIG. 2, except that the embedding module 304 is configured to parse and extract textual features of the new ticket 104, as opposed to a historical support ticket 204 as performed by the feature generation module 206 in FIG. 2. In an embodiment, the embedding module 304 converts the textual data that is extracted from each of the fields into vectors. For example, in an embodiment, the embedding module 304 converts the textual data that is extracted from each of the fields into vectors using Word2Vec. Word2vec is a two-layer neural net that takes a text corpus as input and outputs a set of feature vectors that represent words in that corpus. In an embodiment, the coefficient module 306 is configured to determine a coefficient value for the new ticket 104 based on the vectorized extracted data from the new ticket 104. The coefficient module 306 can also determine a coefficient value for each of the historical support tickets 204 based on the vectorized extracted data from the plurality of historical support tickets 204. The coefficient value for the new ticket 104 can then be compared with the coefficient values of other historical support tickets 204 to identify similar tickets to the new ticket 104. In an embodiment, the coefficient value for a ticket is determined using the Pearson correlation coefficient formula. The Pearson correlation coefficient is a statistical measure of the linear correlation between two variables. The coefficient has a value between +1 and −1. A value of +1 is total positive linear correlation, 0 is no linear correlation, and −1 is total negative linear correlation. The formula for the Pearson correlation coefficient is:

$$r = \frac{\sum (x_i - \bar{x})(y_i - \bar{y})}{\sqrt{\sum (x_i - \bar{x})^2 (y_i - \bar{y})^2}}$$

Where
r=correlation coefficient
$x_i$=values of the x-variable in a sample
$\bar{x}$=mean of the values of the x-variable
$y_i$=values of the y-variable in a sample
$\bar{y}$=mean of the values of the y-variable A non-limiting example of a data table comprising the information of similar tickets to that of the new ticket 104 created by the similarity search module 302 is shown below:

|  | NewT - (X) | OldT1 - (Y) | OldT2 - (Y) | OldT3 - (Y) |
|---|---|---|---|---|
| Subject | System Hang | System Hang | Network Hang | Imported Function failed |
| Description | Call API failed | Regression issue | Compatibility issues | Function failed |
| Product version | 2020 Mar. 15 | 2019 Mar. 15 | 2018 Jun. 15 | 2019 Dec. 03-Beta |
| Operating System | Linux - Suse8 | Windows 2016 | Linux - Suse8 | Linux - Suse8 |
| ... | ... | ... | ... | ... |
| Coefficient - (r) |  | 0.77 | 0.57 | 0.86 | 0.85 |

Once the similarity search module 302 identifies similar tickets to the new ticket 104, it passes the similar tickets to the order module 310. In an embodiment, the order module 310 includes an order top N module 312 and a final top N module 314. The order top N module 312 is configured to order the top N tickets received from the similarity search module 302 based on their similarity. In an embodiment, tickets with the same or similar coefficient values appear in the Top N list. N can be any predetermined number or a user-specified number. The ordered list of top N tickets is then passed to the final top N module 314.

In an embodiment, the final top N module 314 is configured to further order the list of top N tickets based on a second dimension. For example, when two of the historical support tickets 204 in the ordered list of top N tickets have the same or similar similarity (i.e., coefficient values) to that of the new ticket 104, the final top N module 314 references the complexity score to perform a final ranking/sorting of top N tickets. In an embodiment, the final top N module 314 utilizes the complexity score of the Top N work ticket that was used for training the complexity model. In an embodiment, the final top N module 314 is configured to select work tickets (ticket (R)) from a reference pool of tickets 318 that have a large difference between their complexity score and the initial complexity score of the new ticket 104 as determined by the complexity module 106. In an embodiment, the "large difference" is a differentiation of the label, which is equal to the subtraction of the new ticket complexity score and the historical support ticket complexity score. Ticket (R) represents adding a reference information to ensure that the final selected sample is differentiated. The final top N module 314 then performs a final sorting to obtain the final top N tickets and outputs the top N tickets sorted by similarity ($S_i$) and complexity ($C_i$).

FIG. 4 is a schematic drawing illustrating a merge module 400 in accordance with an embodiment of the present disclosure. The merge module 400 is an example of the merge module 110 in FIG. 1. In the depicted embodiment, the merge module 400 includes a weight module 402 and a merge unit 404. As described in FIG. 1, the merge module 400 receives as input an initial complexity value ($C_0$) determined by the complexity module 106, and the top N tickets (Ticket$_i$($S_i$, $C_i$)) sorted by similarity (Si) and complexity (Ci) from the validation module 108. In the depicted embodiment, the weight module 402 is configured to add multi-dimensional considerations to the top N tickets, such as time, user experience and other dimensions, so as to add weight to the similar top N tickets. For instance, in an embodiment, the weight module 402 can apply a time dimension weight to the top N tickets as follows. As an example, assume that the top 3 tickets similar tickets (T1, T2, and T3) to the new ticket have respective complexity values (C1, C2, C3). T1 was reported one year ago. T2 was reported one month ago. T3 was reported one week. According to the reporting times, different time weight values can be applied to the complexity values (C1, C2, C3) of T1, T2, and T3. As an example, a time weight value of 0.1 can be assigned to a reporting time of one year, a time weight value of 0.5 can be assigned to a reporting time of one month, and a time weight value of 0.9 can be assigned to a reporting time of one week. These weight values assign a higher weight to similar tickets that occurred more recently. In an embodiment, the weight complexity values ($C_n$) of the similar tickets is calculated according to the following formula: $C_n = C_i * W_n / \Sigma_{i=1}^{n} W_n$, where $C_i$ is the complexity value of the top N ticket and $W_n$ is the weight value assigned to the ticket.

The weight module 402 passes the weighted complexity values ($C_n$) of the similar top N tickets to the merge unit 404. The merge unit 404 also receives the initial complexity value ($C_0$) determined by the complexity module 106. In an embodiment, the merge unit 404 is configured to combine the initial complexity value ($C_0$) generated by the complexity module 106 with the average weighted complexity values for the top N similar ticket ($C_n$) produced by the validation module 108 to determine a more accurate final complexity value ($C_f$) for the task associated with the ticket 104. In an embodiment, the merge unit 404 determines the final complexity value ($C_f$) of the new ticket as follows: $C_f = C_0 * k + \Sigma_{i=1}^{n} C_n * (1-k)$, where $C_0$ is the initial complexity value, $\Sigma_{i=1}^{n} C_n$ is the average of the weighted top N similar tickets, and k is an adjustment value that can be modified according to the maturity of the complexity model. The merge module 400 then outputs the final complexity value (Cf) as the predicted complexity of the task associated with the new ticket 104.

Figure 5:
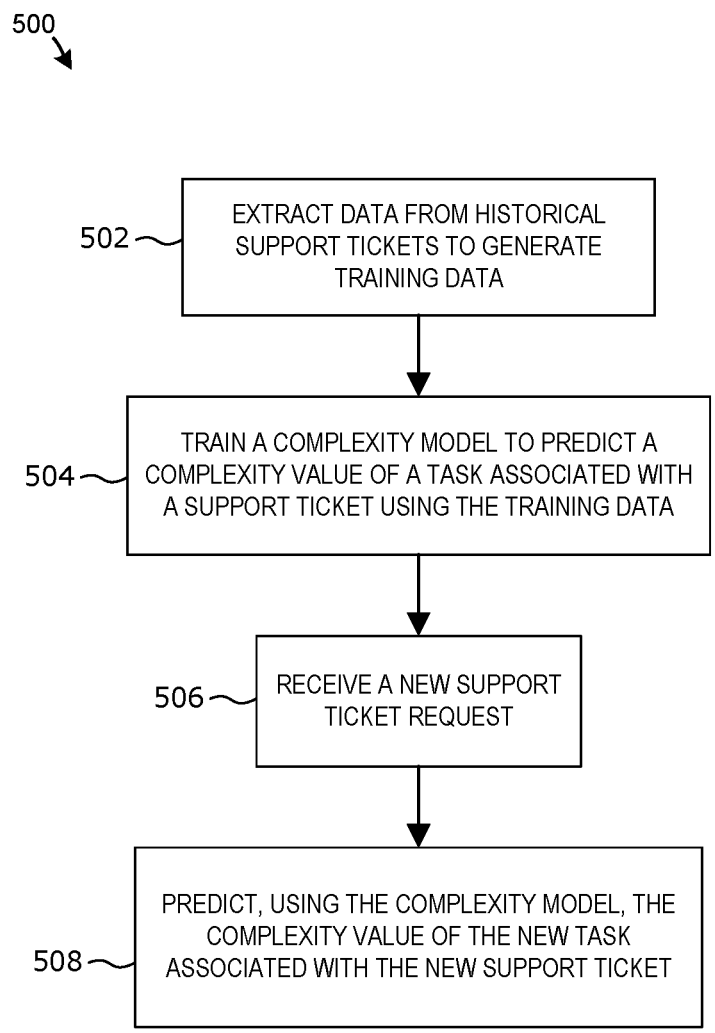
FIG. 5 is a flowchart illustrating a process for predicting a complexity of a task associated with a support ticket in accordance with an embodiment of the present disclosure.

FIG. 5 is a flowchart illustrating a process 500 for predicting a complexity of a task associated with a support ticket in accordance with an embodiment of the present disclosure. In an embodiment, the process 500 can be performed by the customer support system 100 in FIG. 1. The process 500 begins at step 502 by extracting data from the plurality of historical support tickets to generate training data. In an embodiment, the process 500 extracts text characters from one or more text fields of the plurality of historical support tickets, and extracts values from one or more value fields of the plurality of historical support tickets. The process 500 generates one or more features of the plurality of historical support tickets by vectorizing the extracted text characters, and generates one or more labels of the plurality of historical support tickets using the extracted values from the one or more value fields of the plurality of historical support tickets. In an embodiment, the process 500 normalizes each of the extracted values from the one or more value fields of the plurality of historical support tickets so that the extracted values have a maximum value of one. The process 500 can also set a weight value for each of the extracted values. In an embodiment, the process 500 calculates the labels of the plurality of historical support tickets using the weight value for each of the extracted values.

At step 504, the process 500 trains a complexity model to predict a complexity value of a task associated with a support ticket using the training data. In an embodiment, the process 500 trains the complexity model using a linear regression learning algorithm. The process 500, at step 506, receives a new support ticket that requests assistance with performance of a new task.

The process 500, at step 508, predicts, using the complexity model, the complexity value of the new task associated with the new support ticket. In an embodiment, to predict the complexity value of the new task, the process 500 determines an initial complexity value of the new task associated with the new support ticket using the complexity model. The process 500 then determines a set (one or more) of similar support tickets from the plurality of historical support tickets that are similar to the new support ticket. The process 500 adjusts the initial complexity value of the new task associated with the new support ticket based on similarity and complexity values of tickets in the set of similar support tickets to determine the complexity value of the new task associated with the new support ticket. In an embodiment, the process 500 applies a weight to the similarity and complexity values of the similar support tickets in the set of similar tickets. For example, the process 500 can apply a weight based on a reporting time of the similar support tickets in the set of similar tickets. The predicted complexity value of the new task associated with the new support ticket is provides additional information for a support engineer in determining how best to handle support ticket requests.

Figure 6:
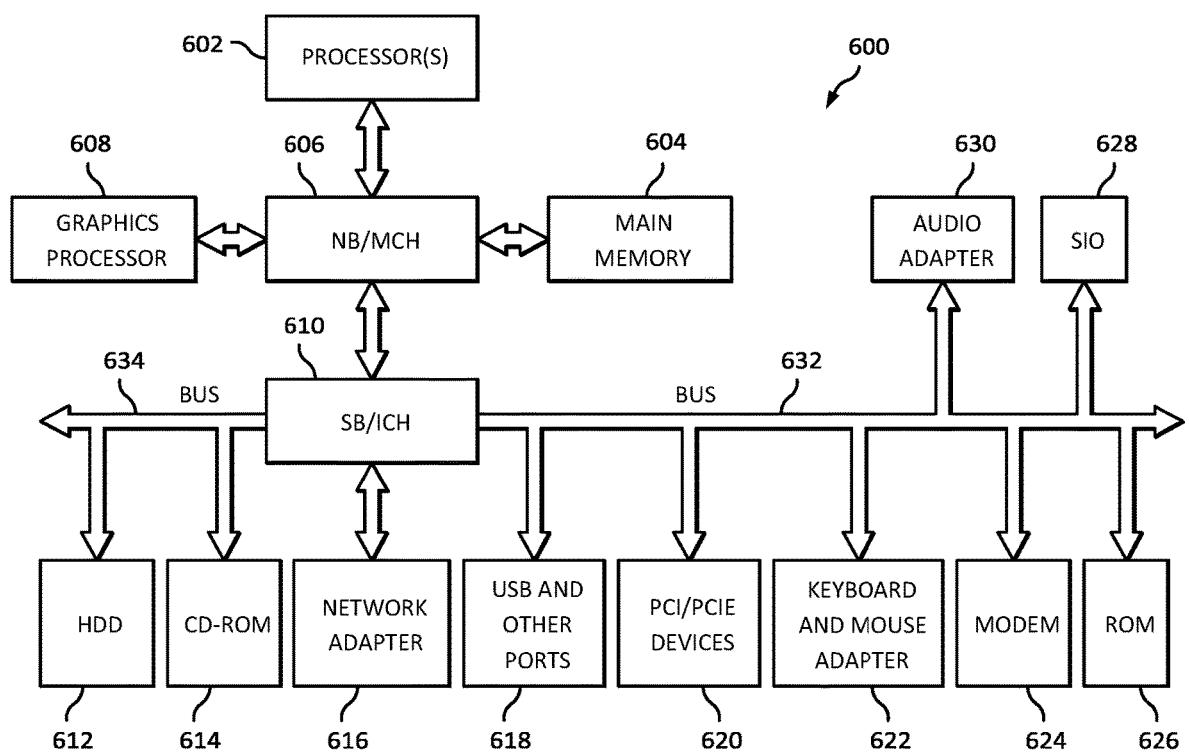
FIG. 6 is a block diagram illustrating a hardware architecture of a system according to an embodiment of the present disclosure in which aspects of the illustrative embodiments may be implemented.

FIG. 6 is a block diagram illustrating a hardware architecture of a system 600 according to an embodiment of the present disclosure in which aspects of the illustrative embodiments may be implemented. In an embodiment, the customer support system 100 in FIG. 1 is implemented using the hardware architecture of the system 600. Additionally, the data processing system 600 may be configured to store and execute instructions for implementing the complexity module 200 in FIG. 2, the validation module 300 in FIG. 3, the merge module 400 in FIG. 4, and the process 500 in FIG. 5. In the depicted example, the data processing system 600 employs a hub architecture including north bridge and memory controller hub (NB/MCH) 606 and south bridge and input/output (I/O) controller hub (SB/ICH) 610. Processor(s) 602, main memory 604, and graphics processor 608 are connected to NB/MCH 606. Graphics processor 608 may be connected to NB/MCH 606 through an accelerated graphics port (AGP). A computer bus, such as bus 632 or bus 634, may be implemented using any type of communication fabric or architecture that provides for a transfer of data between different components or devices attached to the fabric or architecture.

In the depicted example, network adapter 616 connects to SB/ICH 610. Audio adapter 630, keyboard and mouse adapter 622, modem 624, read-only memory (ROM) 626, hard disk drive (HDD) 612, compact disk read-only memory (CD-ROM) drive 614, universal serial bus (USB) ports and other communication ports 618, and peripheral component interconnect/peripheral component interconnect express (PCI/PCIe) devices 620 connect to SB/ICH 610 through bus 632 and bus 634. PCI/PCIe devices may include, for example, Ethernet adapters, add-in cards, and personal computing (PC) cards for notebook computers. PCI uses a card bus controller, while PCIe does not. ROM 626 may be, for example, a flash basic input/output system (BIOS). Modem 624 or network adapter 616 may be used to transmit and receive data over a network.

HDD 612 and CD-ROM drive 614 connect to SB/ICH 610 through bus 634. HDD 612 and CD-ROM drive 614 may use, for example, an integrated drive electronics (IDE) or serial advanced technology attachment (SATA) interface. In some embodiments, HDD 612 may be replaced by other forms of data storage devices including, but not limited to, solid-state drives (SSDs). A super I/O (SIO) device 628 may be connected to SB/ICH 610. SIO device 628 may be a chip on the motherboard configured to assist in performing less demanding controller functions for the SB/ICH 610 such as controlling a printer port, controlling a fan, and/or controlling the small light emitting diodes (LEDS) of the data processing system 600.

The data processing system 600 may include a single processor 602 or may include a plurality of processors 602. Additionally, processor(s) 602 may have multiple cores. For example, in one embodiment, data processing system 600 may employ a large number of processors 602 that include hundreds or thousands of processor cores. In some embodiments, the processors 602 may be configured to perform a set of coordinated computations in parallel.

An operating system is executed on the data processing system 600 using the processor(s) 602. The operating system coordinates and provides control of various components within the data processing system 600 in FIG. 6. Various applications and services may run in conjunction with the operating system. Instructions for the operating system, applications, and other data are located on storage devices, such as one or more HDD 612, and may be loaded into main memory 604 for execution by processor(s) 602. In some embodiments, additional instructions or data may be stored on one or more external devices. The processes described herein for the illustrative embodiments may be performed by processor(s) 602 using computer usable program code, which may be located in a memory such as, for example, main memory 604, ROM 626, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An automated method for predicting a complexity of a task associated with a support ticket, the method comprising:
    obtaining a plurality of historical support tickets;
    generating training data from the plurality of historical support tickets by extracting text characters from text fields and values from value fields of the plurality of historical support tickets, generating features of the plurality of historical support tickets by vectorizing the extracted text characters, and generating labels of the plurality of historical support tickets using the extracted values;
    executing a machine learning algorithm to identify patterns in the training data that map the features and the labels to complexity values of the plurality of historical support tickets to train a complexity model to predict a complexity value of a task associated with the support ticket;
    receiving a new support ticket that requests assistance with performance of a new task;
    extracting second data from the new support ticket;
    converting the second data into a set of vectors using a neural network;
    determining a coefficient value of the new support ticket based on the set of vectors;
    determining an initial complexity value of the new task associated with the new support ticket using the complexity model;
    determining a set of similar support tickets from the plurality of historical support tickets that are similar to the new support ticket based on the coefficient value; and
    adjusting the initial complexity value of the new task associated with the new support ticket based on the complexity values of similar support tickets in the set of similar support tickets to predict the complexity value of the new task associated with the new support ticket.

2. The method of claim 1, wherein generating labels of the plurality of historical support tickets using the extracted values comprises:
    normalizing each of the extracted values from the value fields of the plurality of historical support tickets so that the extracted values have a maximum value of one;
    setting a weight value for each of the extracted values; and
    calculating the labels of the plurality of historical support tickets using the weight value for each of the extracted values.

3. The method of claim 2, wherein calculating the labels of the plurality of historical support tickets using the weight value for each of the extracted values uses formula: $L=W_1*l_1+\Sigma_{i=2}^{n}W_i l_i$, where L is a label, W is the weight value, l is an extracted value/max value, and n is a number of extracted values.

4. The method of claim 1, further comprising applying a weight to the complexity values of the similar support tickets in the set of similar support tickets.

5. The method of claim 4, wherein the weight is based on a reporting time of the similar support tickets in the set of similar support tickets.

6. A system configured to determine a complexity of a task, the system comprising memory for storing instructions, and a processor configured to execute the instructions to:
- obtain a plurality of historical support tickets;
- generate training data from the plurality of historical support tickets by extracting text characters from text fields and values from value fields of the plurality of historical support tickets, generating features of the plurality of historical support tickets by vectorizing the extracted text characters, and generating labels of the plurality of historical support tickets using the extracted values;
- execute a machine learning algorithm to identify patterns in the training data that map the features and the labels to complexity values of the plurality of historical support tickets to train a complexity model to predict a complexity value of a task associated with a support ticket;
- receive a new support ticket that requests assistance with performance of a new task;
- extract second data from the new support ticket;
- convert the second data into a set of vectors using a neural network;
- determine a coefficient value of the new support ticket based on the set of vectors;
- determine an initial complexity value of the new task associated with the new support ticket using the complexity model;
- determine a set of similar support tickets from the plurality of historical support tickets that are similar to the new support ticket based on the coefficient value; and
- adjust the initial complexity value of the new task associated with the new support ticket based on the complexity values of similar support tickets in the set of similar support tickets to predict the complexity value of the new task associated with the new support ticket.

7. The system of claim 6, wherein generating the labels of the plurality of historical support tickets using the extracted values comprises:
- normalizing each of the extracted values from the value fields of the plurality of historical support tickets so that the extracted values have a maximum value of one;
- setting a weight value for each of the extracted values; and
- calculating the labels of the plurality of historical support tickets using the weight value for each of the extracted values.

8. The system of claim 7, wherein calculating the labels of the plurality of historical support tickets using the weight value for each of the extracted values uses formula: $L=W_1*l_1+\Sigma_{i=2}^{n}W_i l_i$, where L is a label, W is the weight value, l is an extracted value/max value, and n is a number of extracted values.

9. The system of claim 6, wherein the processor is further configured to execute the instructions to apply a weight to the complexity values of the similar support tickets in the set of similar support tickets.

10. The system of claim 9, wherein the weight is based on a reporting time of the similar support tickets in the set of similar support tickets.

11. A computer program product for determining a complexity of a task, the computer program product comprising a computer readable storage medium having program instructions embodied therewith, the program instructions executable by a processor of a system to cause the system to:
- obtain a plurality of historical support tickets;
- generate training data from the plurality of historical support tickets by extracting text characters from text fields and values from value fields of the plurality of historical support tickets, generating features of the plurality of historical support tickets by vectorizing the extracted text characters, and generating labels of the plurality of historical support tickets using the extracted values;
- execute a machine learning algorithm to identify patterns in the training data that map the features and the labels to complexity values of the plurality of historical support tickets to train a complexity model to predict a complexity value of a task associated with a support ticket;
- receive a new support ticket that requests assistance with performance of a new task;
- extract second data from the new support ticket;
- convert the second data into a set of vectors using a neural network;
- determine a coefficient value of the new support ticket based on the set of vectors;
- determine an initial complexity value of the new task associated with the new support ticket using the complexity model;
- determine a set of similar support tickets from the plurality of historical support tickets that are similar to the new support ticket based on the coefficient value; and
- adjust the initial complexity value of the new task associated with the new support ticket based on the complexity values of similar support tickets in the set of similar support tickets to predict the complexity value of the new task associated with the new support ticket.

12. The computer program product of claim 11, wherein generating the labels of the plurality of historical support tickets using the extracted values comprises:
- normalizing each of the extracted values from the value fields of the plurality of historical support tickets so that the extracted values have a maximum value of one;
- setting a weight value for each of the extracted values; and
- calculating the labels of the plurality of historical support tickets using the weight value for each of the extracted values.

13. The computer program product of claim 11, wherein the program instructions executable by the processor of the system further cause the system to apply a weight to the complexity values of the similar support tickets in the set of similar support tickets.

14. The computer program product of claim 13, wherein the weight is based on a reporting time of the similar support tickets in the set of similar support tickets.

* * * * *